United States Patent
Yang

(10) Patent No.: US 7,443,383 B2
(45) Date of Patent: Oct. 28, 2008

(54) WIRELESS OPTICAL POINTING DEVICE WITH A COMMON OSCILLATION CIRCUIT

(75) Inventor: Jin-Hsin Yang, Taipei Hsien (TW)

(73) Assignee: PixArt Imaging Inc., Hsin-Chu (TW)

( * ) Notice: Subject to any disclaimer, the term of this patent is extended or adjusted under 35 U.S.C. 154(b) by 436 days.

(21) Appl. No.: 11/005,462

(22) Filed: Dec. 6, 2004

(65) Prior Publication Data

US 2005/0237303 A1    Oct. 27, 2005

(30) Foreign Application Priority Data

Apr. 21, 2004    (TW) ............................... 93111086 A

(51) Int. Cl.
*G09G 5/08*    (2006.01)
*G06F 3/033*    (2006.01)

(52) U.S. Cl. ...................................... 345/166

(58) Field of Classification Search .......... 345/156–166
See application file for complete search history.

(56) References Cited

U.S. PATENT DOCUMENTS

| 4,751,505 | A  | * | 6/1988  | Williams et al. ............. 345/166 |
| 5,854,621 | A  | * | 12/1998 | Junod et al. .................. 345/158 |
| 6,781,570 | B1 | * | 8/2004  | Arrigo et al. ................. 345/158 |
| 7,228,102 | B2 | * | 6/2007  | Gordon ........................ 455/19  |
| 2003/0174123 | A1 | * | 9/2003 | Cheng ......................... 345/163 |
| 2005/0237303 | A1 | * | 10/2005 | Yang ............................ 345/166 |

* cited by examiner

*Primary Examiner*—Amare Mengistu
*Assistant Examiner*—Elijah M Sheets
(74) *Attorney, Agent, or Firm*—Tung & Associates

(57) ABSTRACT

A wireless optical pointing device. The wireless optical pointing device comprises a photo sensor detecting a series of continuous images on an operating surface, a processing unit coupled with the photo sensor, processing the detected images, and outputting an image displacement signal accordingly, and a RF (Radio Frequency) unit coupled with the processing unit and transmitting a RF signal according to the image displacement signal, wherein the photo sensor and the RF unit receive a common oscillation frequency source and operate accordingly.

14 Claims, 6 Drawing Sheets

WIRELESS OPTICAL POINTING DEVICE WITH A COMMON OSCILLATION CIRCUIT

BACKGROUND

The present invention relates to a wireless optical pointing device.

A mouse is a commonly used input device. A wheel mouse processes displacement, button, and interface signals and communicates with a computer via an interface using the mechanical structure of its wheel and a micro-controller chip. An optical mouse replaces the mechanical structure of the wheel mouse with a complementary metal oxide semiconductor (CMOS) photo sensor chip capable of optical navigation. The CMOS photo sensor detects a series of continuous images on an operating surface. The displacement of the optical mouse can be determined by processing the images. Moreover, the mouse can communicate with the computer wirelessly via signal transmission.

FIG. 1a is a diagram of a conventional wireless optical mouse 10. FIG. 1b is a diagram showing a photo sensor 13, an MCU (Micro-Controller Unit) 14, a RF (Radio Frequency) transmitter 15, and two crystal oscillators 16 and 17 inside the wireless optical mouse 10 in FIG. 1a. As shown in FIG. 1b, typically, a wireless optical mouse 10 has a photo sensor 13, an MCU (Micro-Controller Unit) 14, and a RF transmitter 15. The photo sensor 13 is provided with an oscillation frequency by a crystal oscillator 16. The RF transmitter 15 is provided with an oscillation frequency by another crystal oscillator 17. When the wireless optical mouse 10 is operated, the photo sensor 13 outputs a displacement of the wireless optical mouse 10 to the MCU 14. The MCU 14 then converts the received displacement of the wireless optical mouse 10 and button state information as a modulation signal and outputs the modulation signal to the RF transmitter 15. Thus, the RF transmitter 15 transmits the displacement and the button state information to a computer (not shown in drawings) via a RF carrier wave (not shown in drawings). The RF carrier wave is provided by the crystal oscillator 17.

Due to frequency band limitations, the RF transmitter 15 of the wireless optical mouse 10 typically operates within a frequency in the citizen band (CB) such as 27 megahertz (MHz). Thus, the crystal oscillator 17 provides a RF carrier wave of 27 MHz to the RF transmitter 15. Additionally, the photo sensor 13 typically operates at 18.43 MHz, so the crystal oscillator 16 provides an oscillation signal of 18.43 MHz to the photo sensor 13. Thus, the wireless optical mouse 10 requires two separate crystal oscillators 16 and 17, thus increasing production cost and power consumption.

SUMMARY

Accordingly, an embodiment of a wireless optical pointing device comprises a photo sensor detecting a series of continuous images on an operating surface, a processing unit coupled with the photo sensor, processing the detected images, and outputting an image displacement signal accordingly, and a RF (Radio Frequency) unit coupled with the processing unit and transmitting a RF signal according to the image displacement signal, wherein the photo sensor and the RF unit receive a common oscillation frequency source and operate accordingly, and the photo sensor and the processing unit are integrated on the same chip.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1b is a diagram showing a photo sensor, an MCU (Micro-Controller Unit), a RF transmitter, and two crystal oscillators inside the wireless optical mouse in FIG. 1a.

FIG. 2b is a diagram showing a photo sensor, an MCU, a RF transmitter, and a crystal oscillator inside the wireless optical mouse in FIG. 2a.

FIG. 3b is a diagram showing an integrated chip inside the wireless optical mouse in FIG. 3a.

DETAILED DESCRIPTION

A principle aim of the invention is to reduce the number of crystal oscillators in a wireless optical mouse by employing a photo sensor and a RF transmitter using a common oscillator inside the photo sensor. The photo sensor must be designed to be capable of operating at a system frequency in the citizen band (CB) such as 27 megahertz (MHz).

First Embodiment

Figure 1A:
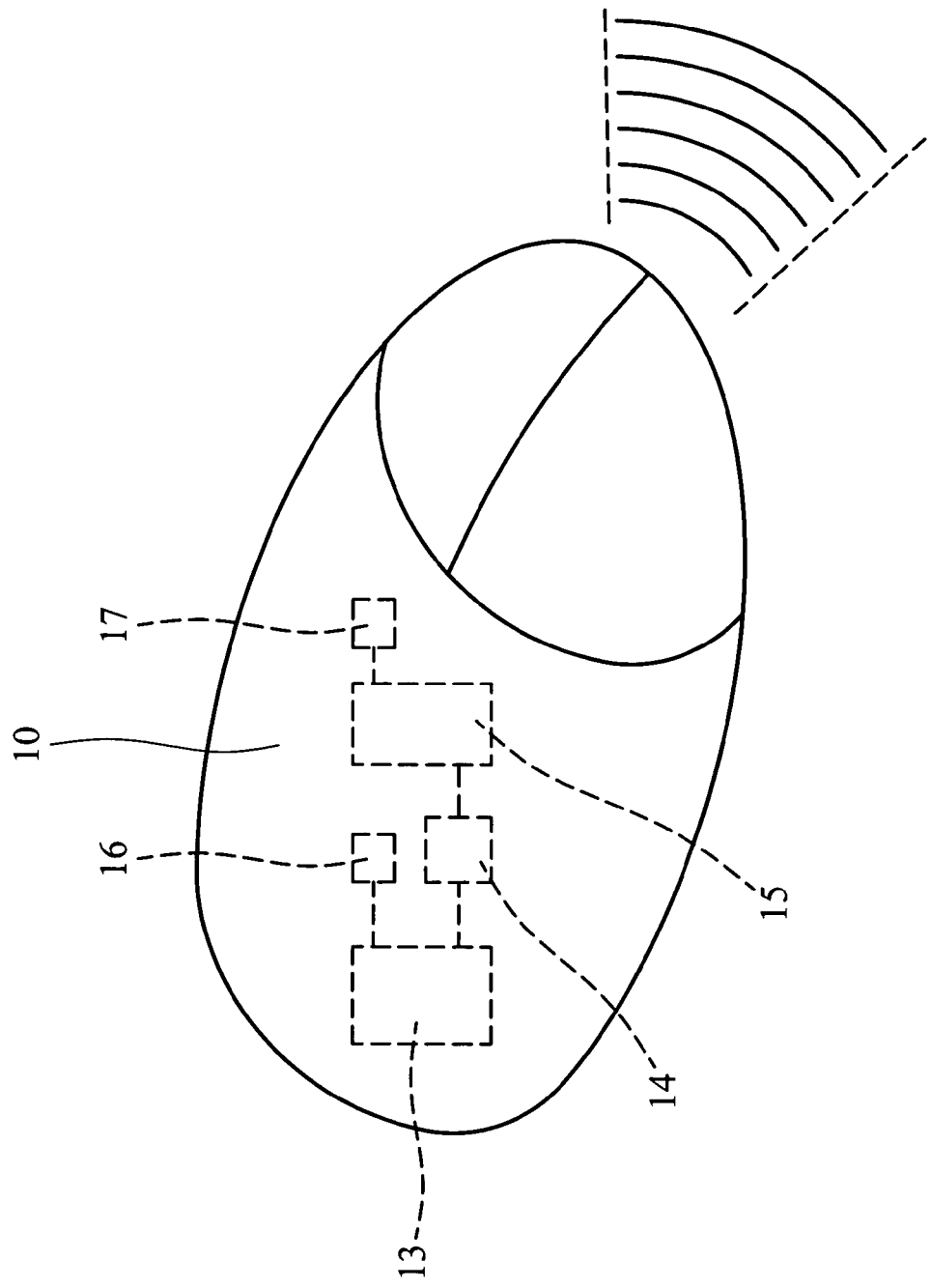
FIG. 1a is a diagram of a conventional wireless optical mouse.
Figure 1B:
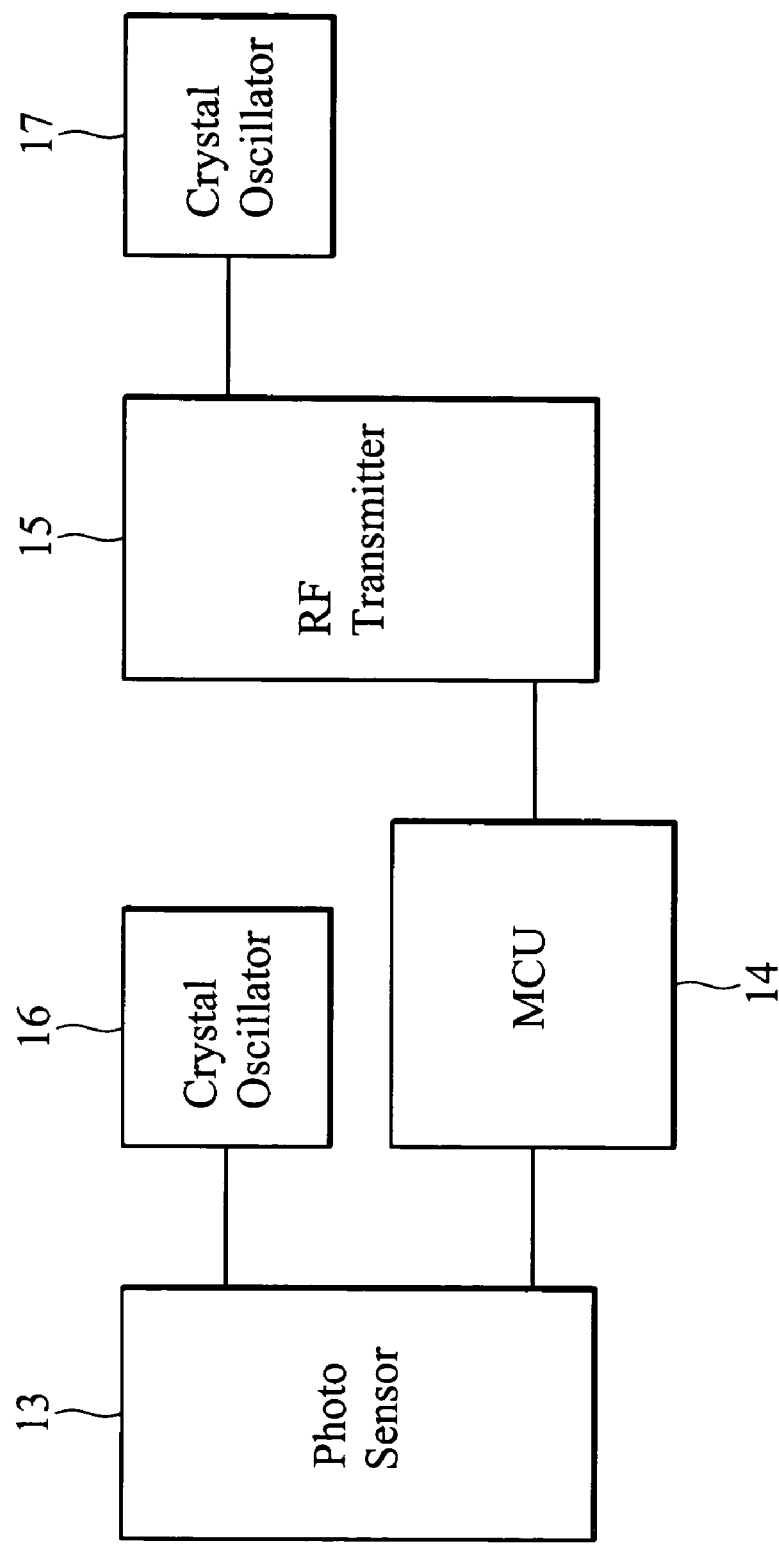
Figure 2A:
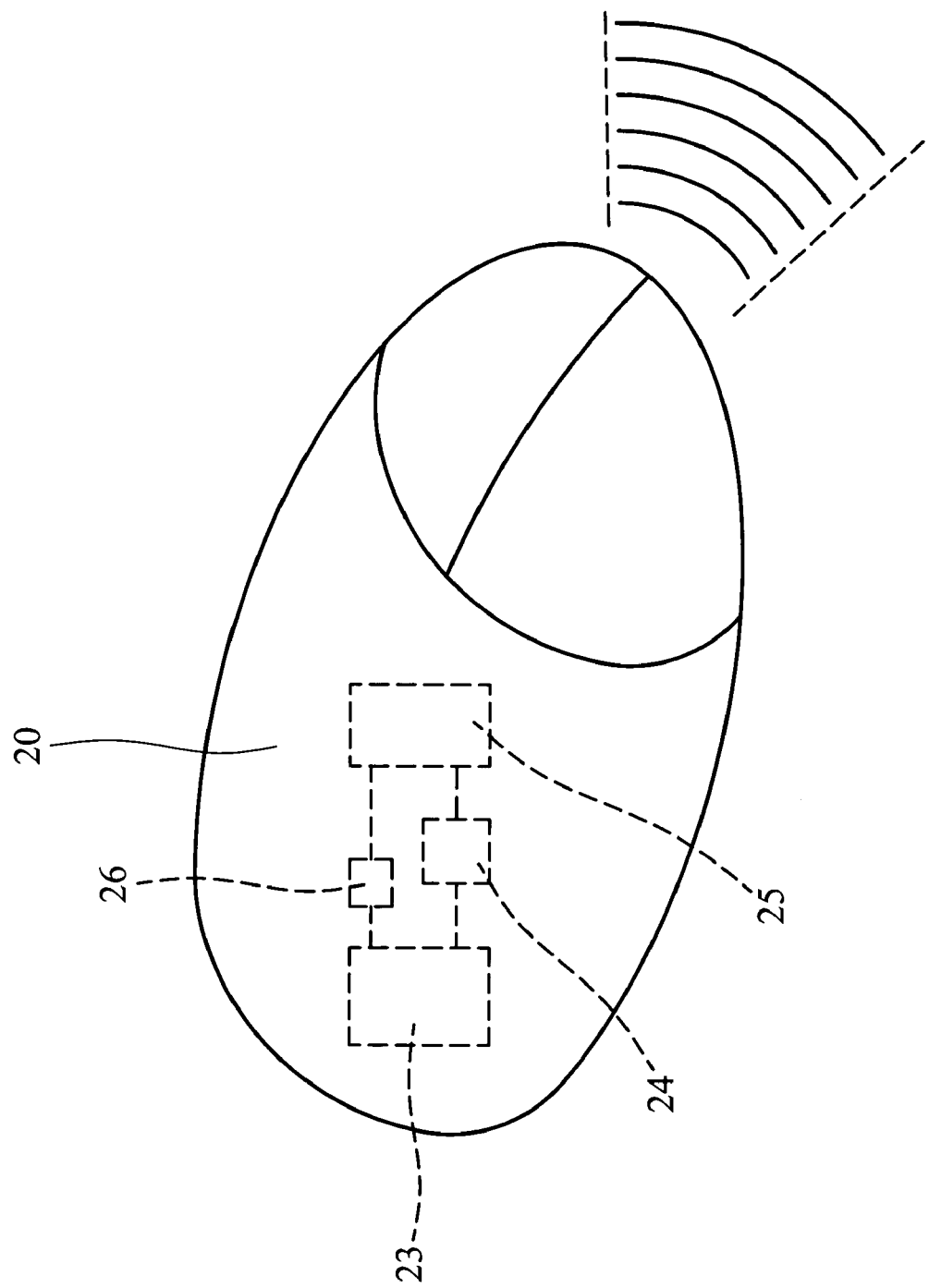
FIG. 2a is a diagram of the wireless optical mouse in a first embodiment of the invention.
Figure 2B:
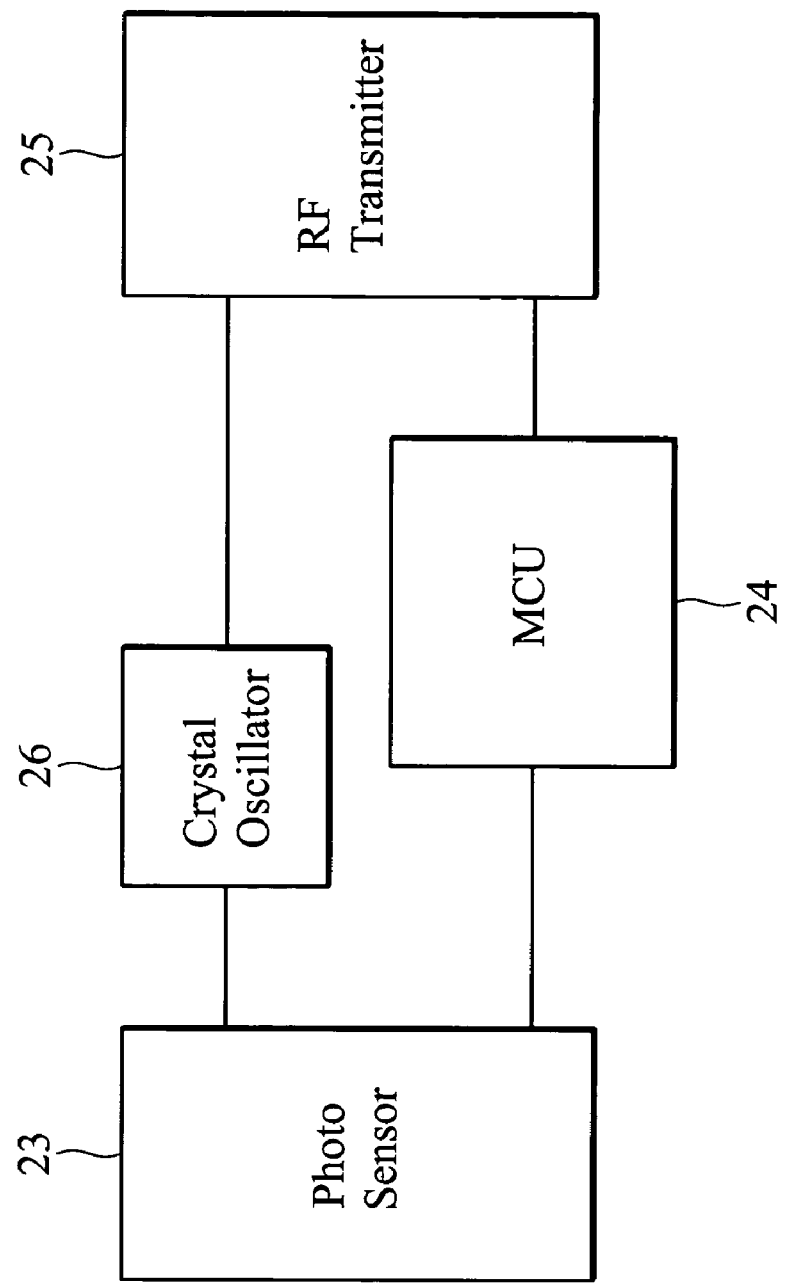

FIG. 2a is a diagram of the wireless optical mouse 20 in the first embodiment of the invention. FIG. 2b is a diagram showing a photo sensor 23, an MCU 24, a RF transmitter 25, and a crystal oscillator 26 inside the wireless optical mouse 20 in FIG. 2a. As shown in FIG. 2b, the wireless optical mouse 20 has a photo sensor 23, an MCU 24, and a RF transmitter 25. The photo sensor 23 and the RF transmitter 25 receive oscillation frequencies provided by a common crystal oscillator 26 and operate accordingly. When the wireless optical mouse 20 is operated on an operating surface, the photo sensor 23 detects a series of continuous images on the operating surface. The displacement of the wireless optical mouse 20 can be determined by processing the images and output to the MCU 24 coupled with the photo sensor 23. The MCU 24 then converts the received displacement and button information as a modulation signal and outputs the modulation signal to the RF transmitter 25 coupled with the MCU 24. Thus, the RF transmitter 25 transmits the displacement and the button information to a computer (not shown in drawings) via a RF carrier wave (not shown in drawings).

Because the photo sensor 23 and the RF transmitter 25 are electrically coupled to a common crystal oscillator 26, the photo sensor 23 and the RF transmitter 25 receive oscillation frequencies provided by the common crystal oscillator 26 and operate accordingly. The common crystal oscillator 26 provides the photo sensor 23 and the RF transmitter 25 with the same oscillation frequency, or alternatively with different oscillation frequencies respectively. Oscillation frequencies provided by the common crystal oscillator 26 are located in HF (High Frequency) or VHF (Very High Frequency) bands, for example, in the citizen band (CB) such as 27 megahertz (MHz).

In this embodiment, the photo sensor 23 and the RF transmitter 25 are electrically coupled to the common crystal oscillator 26, so the number of crystal oscillators in the wireless optical mouse 20 is reduced, thereby reducing the volume and the production cost of the wireless optical mouse 20.

Second Embodiment

Figure 3A:
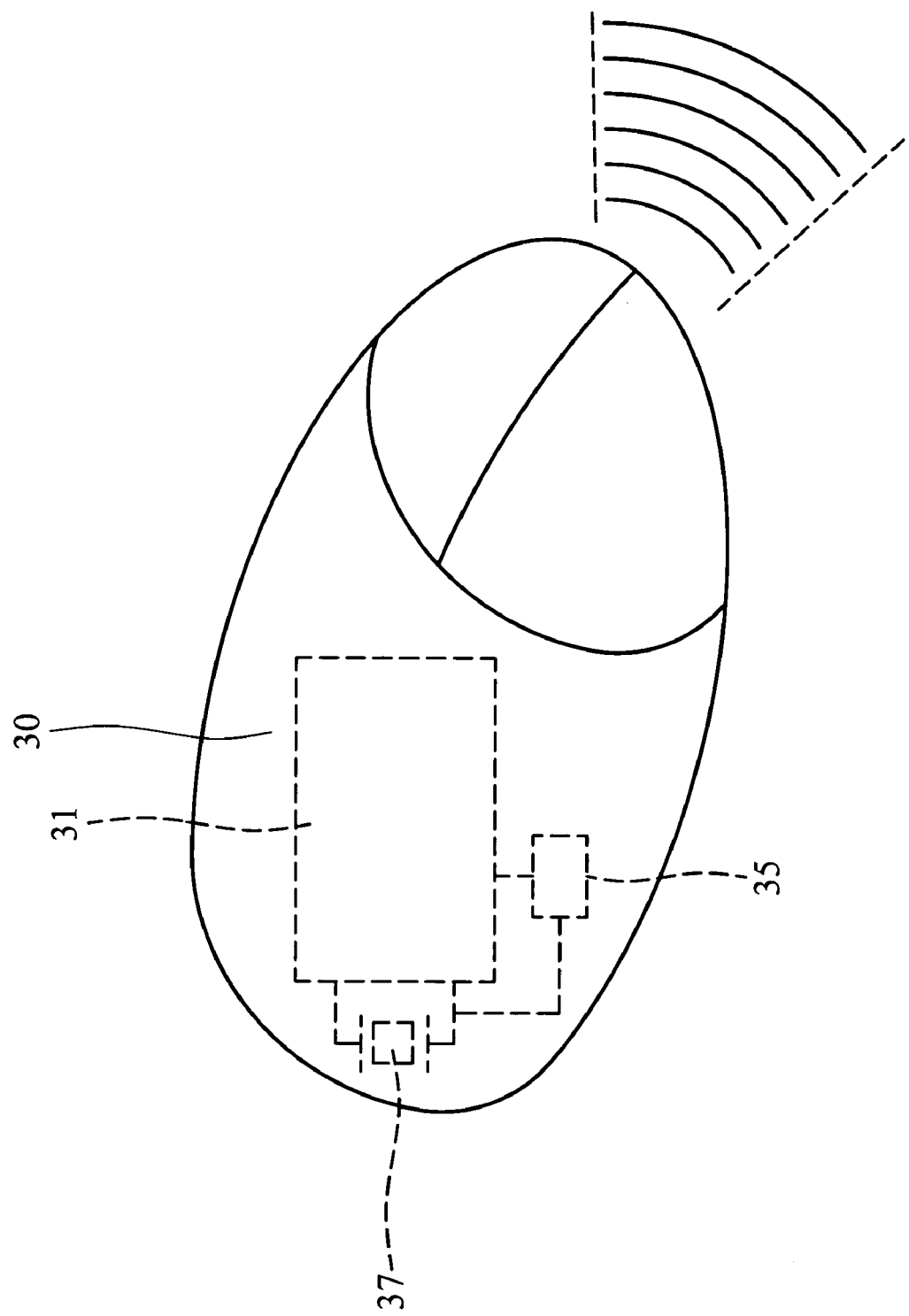
FIG. 3a is a diagram of the wireless optical mouse in a second embodiment of the invention.
Figure 3B:
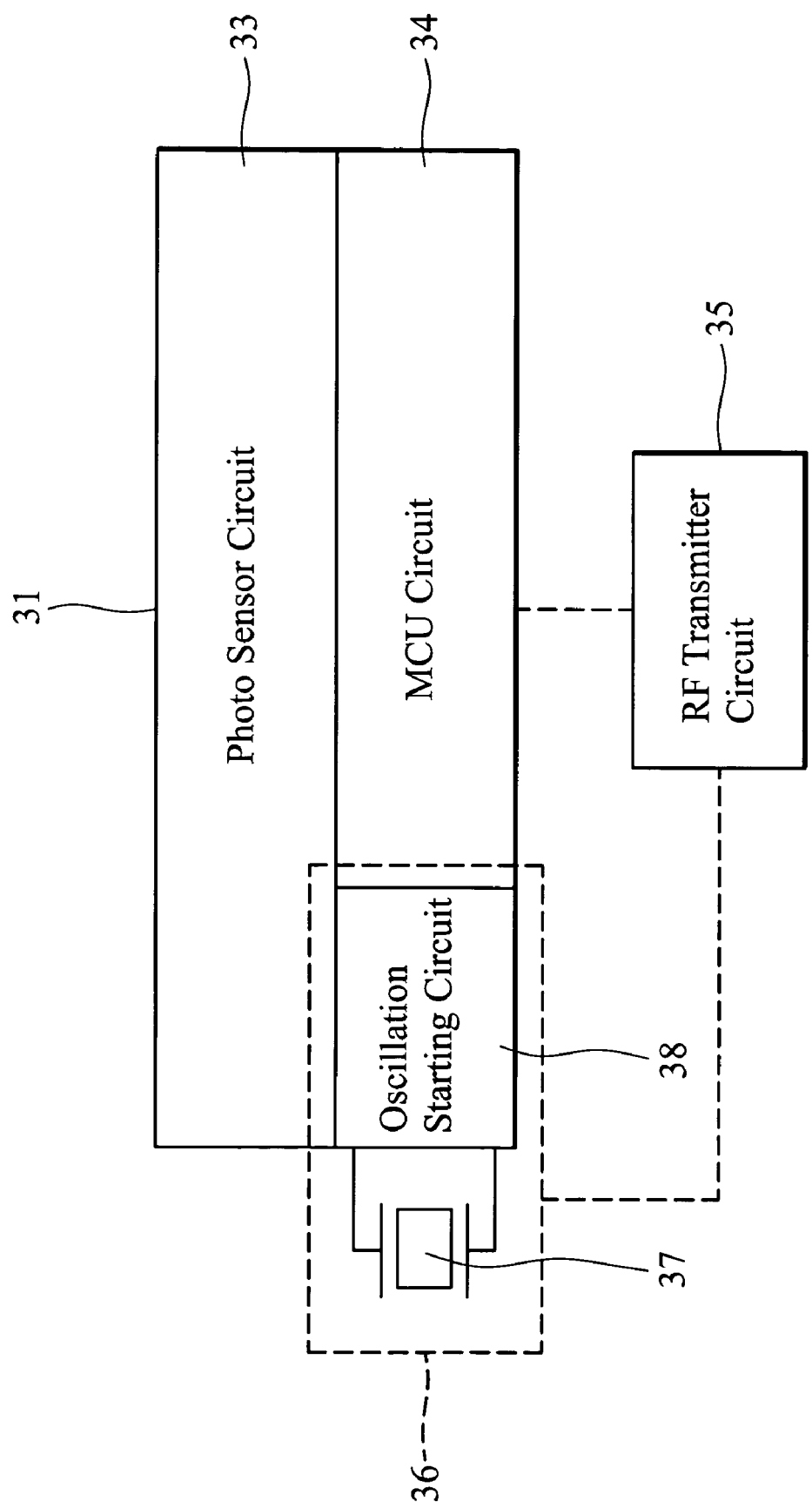

FIG. 3a is a diagram of the wireless optical mouse 30 in the second embodiment of the invention. FIG. 3b is a diagram showing an integrated chip 31 inside the wireless optical mouse 30 in FIG. 3a. As shown in FIGS. 3a and 3b, the wireless optical mouse 30 has an integrated chip 31 comprising a photo sensor circuit 33 and an MCU circuit 34. The wireless optical mouse 30 further comprises a RF transmitter circuit 35 coupled with the MCU circuit 34. The photo sensor circuit 33 and the RF transmitter circuit 35 receive oscillation frequencies provided by a common crystal oscillation circuit 36 and operate accordingly. The common crystal oscillation circuit 36 comprises a crystal 37 and an oscillation starting circuit 38. The oscillation starting circuit 38 is integrated in the integrated chip 31. When the wireless optical mouse 30 is operated on an operating surface, the photo sensor circuit 33 detects a series of continuous images on the operating surface. The displacement of the wireless optical mouse 30 can be determined by processing the images and output to the MCU circuit 34 coupled with the photo sensor circuit 33. The MCU circuit 34 then converts the received displacement and button state information as a modulation signal and outputs the modulation signal to the RF transmitter circuit 35 coupled with the MCU circuit 34. Thus, the RF transmitter circuit 35 transmits the displacement and the button state information to a computer (not shown in drawings) via a RF carrier wave (not shown in drawings).

Because the photo sensor circuit 33 and the RF transmitter circuit 35 are electrically coupled to a common crystal oscillation circuit 36, the photo sensor circuit 33 and the RF transmitter circuit 35 receive oscillation frequencies provided by the common crystal oscillation circuit 36 and operate accordingly. The common crystal oscillation circuit 36 provides the photo sensor circuit 33 and the RF transmitter circuit 35 with the same oscillation frequency, or alternatively with different oscillation frequencies respectively. Oscillation frequencies provided by the common crystal oscillation circuit 36 are located in HF (High Frequency) or VHF (Very High Frequency) bands, for example, in the citizen band (CB) such as 27 megahertz (MHz).

In this embodiment, the photo sensor circuit 33 and the MCU circuit 34 are integrated in the integrated chip 31, thereby reducing production cost, power consumption, chip pins, and external components, and improving the integration level of components in the wireless optical mouse 30.

Alternatively, in this embodiment, the photo sensor circuit 33, the MCU circuit 34, and the RF transmitter circuit 35 can all be integrated in the integrated chip 31.

Due to frequency band limitations, the RF transmitter 25, or the RF transmitter circuit 35, of the wireless optical mouse in embodiments of the present invention must operate within a frequency in the citizen band (CB) such as 27 MHz. Thus, the photo sensor 23, or the photo sensor circuit 33, must operate at 27 MHz accordingly. Conventionally, the photo sensor is tested at 18.43 MHz of design specification, other than 27 MHz. Thus, it must be verified that the photo sensor can operate normally in the citizen band (CB) when implementing embodiments of the present invention. When oscillation signals are modulated in the citizen band (CB), the RF transmitter 25, or the RF transmitter circuit 35, modulates the RF carrier wave of 27 MHz. Thus, it must be verified that the photo sensor can operate normally regardless of influence of the modulation process. Through testing and experimentation, those skilled in the art can achieve this requirement in designing circuits or chips.

In embodiments of the present invention, the photo sensor (or the photo sensor circuit) and the RF transmitter (or the RF transmitter circuit) are electrically coupled to a common crystal oscillator, thus reducing the number of required crystal oscillators, the volume, and the production cost of the wireless optical mouse.

Additionally, the photo sensor circuit and the MCU circuit are integrated in the same chip, thereby reducing production cost, power consumption and improving the integration level of components in the wireless optical mouse.

Alternatively, in embodiments of the present invention, the photo sensor circuit, the MCU circuit, and the RF transmitter circuit can be integrated in the same chip.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless electronic device, comprising:
   a photo sensor detecting a series of continuous images;
   a processing unit coupled with the photo sensor, processing the detected images, and outputting an image displacement signal accordingly; and
   a RF (Radio Frequency) unit coupled with the processing unit and transmitting a RF signal according to the image displacement signal;
   wherein the photo sensor and the RF unit receive a common oscillation frequency source and operate accordingly.

2. The wireless electronic device as claimed in claim 1, wherein oscillation frequencies provided by the common oscillation frequency source are located in RF (High Frequency) or VHF (Very High Frequency) bands.

3. The wireless electronic device as claimed in claim 1, wherein the photo sensor and the RF unit are electrically coupled to a common crystal oscillator, so the photo sensor and the RF unit receive oscillation frequencies provided by the common crystal oscillator and operate accordingly.

4. The wireless electronic device as claimed in claim 1, wherein the photo sensor and the RF unit operate at the same frequency.

5. The wireless electronic device as claimed in claim 1, wherein the photo sensor and the RF unit operate at different frequencies.

6. The wireless electronic device as claimed in claim 1, wherein the photo sensor and the processing unit are integrated in the same chip.

7. A wireless optical pointing device, comprising:
   a photo sensor detecting a series of continuous images on an operating surface;
   a processing unit coupled with the photo sensor, processing the detected images, and outputting an image displacement signal accordingly; and
   a RF (Radio Frequency) unit coupled with the processing unit and transmitting a RF signal according to the image displacement signal;
   wherein the photo sensor and the RF unit receive a common oscillation frequency source and operate accordingly.

8. The wireless optical pointing device as claimed in claim 7, wherein oscillation frequencies provided by the common oscillation frequency source are located in HF (High Frequency) or VHF (Very High Frequency) bands.

9. The wireless optical pointing device as claimed in claim 7, wherein the photo sensor and the RF unit are electrically coupled to a common crystal oscillator, receive oscillation frequencies provided thereby, and operate accordingly.

10. The wireless optical pointing device as claimed in claim 7, wherein the photo sensor and the RF unit operate at the same frequency.

11. The wireless optical pointing device as claimed in claim 7, wherein the photo sensor and the RF unit operate at different frequencies.

12. The wireless optical pointing device as claimed in claim 7, wherein the processing unit and the RF unit are integrated in the same chip.

13. The wireless optical pointing device as claimed in claim 7, wherein the photo sensor and the processing unit are integrated in the same chip.

14. The wireless optical pointing device as claimed in claim 7, wherein the photo sensor, the processing unit, and the RF unit are integrated in the same chip.

* * * * *